US011859805B2

(12) United States Patent
Tress et al.

(10) Patent No.: US 11,859,805 B2
(45) Date of Patent: Jan. 2, 2024

(54) TAPE LIGHT TERMINATION SYSTEM

(71) Applicant: Rev-A-Shelf Company, LLC, Louisville, KY (US)

(72) Inventors: Christopher Michael Tress, Louisville, KY (US); Andrew Logan Silvers, Jeffersonville, IN (US)

(73) Assignee: REV-A-SHELF COMPANY, LLC, Louisville, KY (US)

( * ) Notice: Subject to any disclaimer, the term of this patent is extended or adjusted under 35 U.S.C. 154(b) by 40 days.

(21) Appl. No.: 17/509,920

(22) Filed: Oct. 25, 2021

(65) Prior Publication Data

US 2023/0125836 A1 Apr. 27, 2023

(51) Int. Cl.

| | |
|---|---|
| ***F21V 23/06*** | (2006.01) |
| ***F21S 4/24*** | (2016.01) |
| ***H01R 33/18*** | (2006.01) |
| ***F21Y 113/13*** | (2016.01) |
| ***F21Y 103/10*** | (2016.01) |
| ***F21Y 115/10*** | (2016.01) |

(52) U.S. Cl.

CPC ................ *F21V 23/06* (2013.01); *F21S 4/24* (2016.01); *H01R 33/18* (2013.01); *F21Y 2103/10* (2016.08); *F21Y 2113/13* (2016.08); *F21Y 2115/10* (2016.08)

(58) Field of Classification Search

CPC .... F21S 4/24; F21S 4/22; F21V 23/06; H01R 33/18

See application file for complete search history.

(56) References Cited

U.S. PATENT DOCUMENTS

| | | | | |
|---|---|---|---|---|
| 10,591,114 B1 * | 3/2020 | Lassen | .................. | F21V 15/013 |
| 10,727,621 B1 * | 7/2020 | Senofsky | ............... | H01R 12/79 |
| 10,826,202 B1 * | 11/2020 | Lowe | ..................... | H01R 35/04 |

(Continued)

FOREIGN PATENT DOCUMENTS

GB 2582046 A * 9/2020 ............... H01R 4/36

OTHER PUBLICATIONS

"Single Side 4 PIN RGB LED Strip Conenctor," at least as early as Jun. 2021, pp. 1-2, Ledbe, available at https://www.ledbe.com/4PINRGBLED/StripConnector.

(Continued)

*Primary Examiner* — William N Harris

(74) *Attorney, Agent, or Firm* — Crowell & Moring LLP

(57) ABSTRACT

A tape light termination system includes a terminal in a housing. The terminal includes an electrically conducting contact area and a termination lug to fixedly connect an electric conductor with the terminal and provide an electrically conducting path between the termination lug and the contact point. The housing includes compartments sized to receive and hold the terminal, and slots which are positioned and dimensioned to receive opposing edges of a light emitting diode (LED) tape light. The LED tape light includes a flexible strip having LED diode circuitry and an electrically conductive pad on the planar surface. Each of the slots provide access in the housing to the electrically conductive contact area and alignment of the electrically conducting contact area of the terminal to contiguously contact the electrically conductive pad and enable a current flow path therebetween.

16 Claims, 6 Drawing Sheets

(56) References Cited

U.S. PATENT DOCUMENTS

| | | | | |
|---|---|---|---|---|
| 2015/0241035 | A1* | 8/2015 | Dankelmann | F21V 21/005<br>439/725 |
| 2015/0303632 | A1* | 10/2015 | Tremaine | H01R 43/20<br>439/626 |
| 2020/0132288 | A1* | 4/2020 | Ouyang | F21V 23/023 |

OTHER PUBLICATIONS

"6 Pins LED Connector for 12mm RGB+CCT Non-Waterproof LED Strip Lights-Strip to 1.64ft Wire Quick Connection, 20-22 AWG Wire No Stripping," at least as early as Jun. 2021, pp. 1-4, SuperLightingLED.Inc., available at https://www.superlightingled.com/6-pin-led-connector-for-12mm-rgbcct-nonwaterproof-led-strip-lights-strip-to-164ft-wire-quick-connection-2022-awg-wire-no-stripping-p-3252.html.

"5pcs High Density COB LED Strip Connector for IP20 8mm 10mm 2pin Single Color 5050 3528 Tape Light Strip to Wire FOB Connectors," at least as early as Jun. 2021, pp. 1-13, EliExpress.com, available at https;//www.aliexpress.com/item/1005001687813800.html.

"High Density SMD/COB LED led Strip Connector," at least as early as Jun. 2021, pp. 1-8, Onlumi Technology, available at https://www.onlumi.com/.

* cited by examiner

TAPE LIGHT TERMINATION SYSTEM

FIELD

The present disclosure relates generally to light emitting diode (LED) lighting, and more particularly to LED tape light termination systems.

BACKGROUND

The use of LED tape lights may occur in lighting applications where a small form factor is desired. Such LED tape lights may emit white light, yellow light, and/or other colors. LED tape lights generally include a number of LED light sources mounted on the surface of a tape having an adhesive backing to adhere to objects, such as cabinets, countertops, cupboards and drawers. LED tape lights may be powered by a power supply and controlled with a switch and/or a rheostat.

SUMMARY

Further areas of applicability will become apparent from the description provided herein. It should be understood that the description and specific examples are intended for purposes of illustration only and are not intended to limit the scope of the present disclosure.

In an example, a tape light termination system may include a housing having a compartments that are aligned in the housing to have a common wall therebetween. Terminals may be positioned in each of the respective compartments. At least two of the compartments may have a shared slot providing egress to the at least two compartments by a light emitting diode (LED) tape light. The LED tape light may include a flexible strip. The flexible strip may be received in the shared slot to extend between and separate the at least two compartments from each other. The flexible strip may be electrically coupled with the terminals on opposite sides of the flexible strip.

In another example, a tape light termination system may include a housing having a first side configured to receive power conductors and a second side configured to receive a light emitting diode (LED) tape light. The LED tape light may include LED diodes mounted on a planar surface of a flexible strip. A terminal may be mounted in the housing such that a conductor termination end of the terminal is aligned with the second side of the housing. The conductor termination end of the terminal may be configured to electrically couple with the conductors. An LED tape light receptacle end of the terminal may be accessible from the first side of the housing. The housing may include a landing shelf formed in the housing and sized to receive the LED tape light. The landing shelf may be aligned with parallel slots formed in the housing on either side of the landing shelf to receive a portion of the LED tape light. The LED tape light receptacle end may be positioned in the housing to electrically couple with the LED tape light.

DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
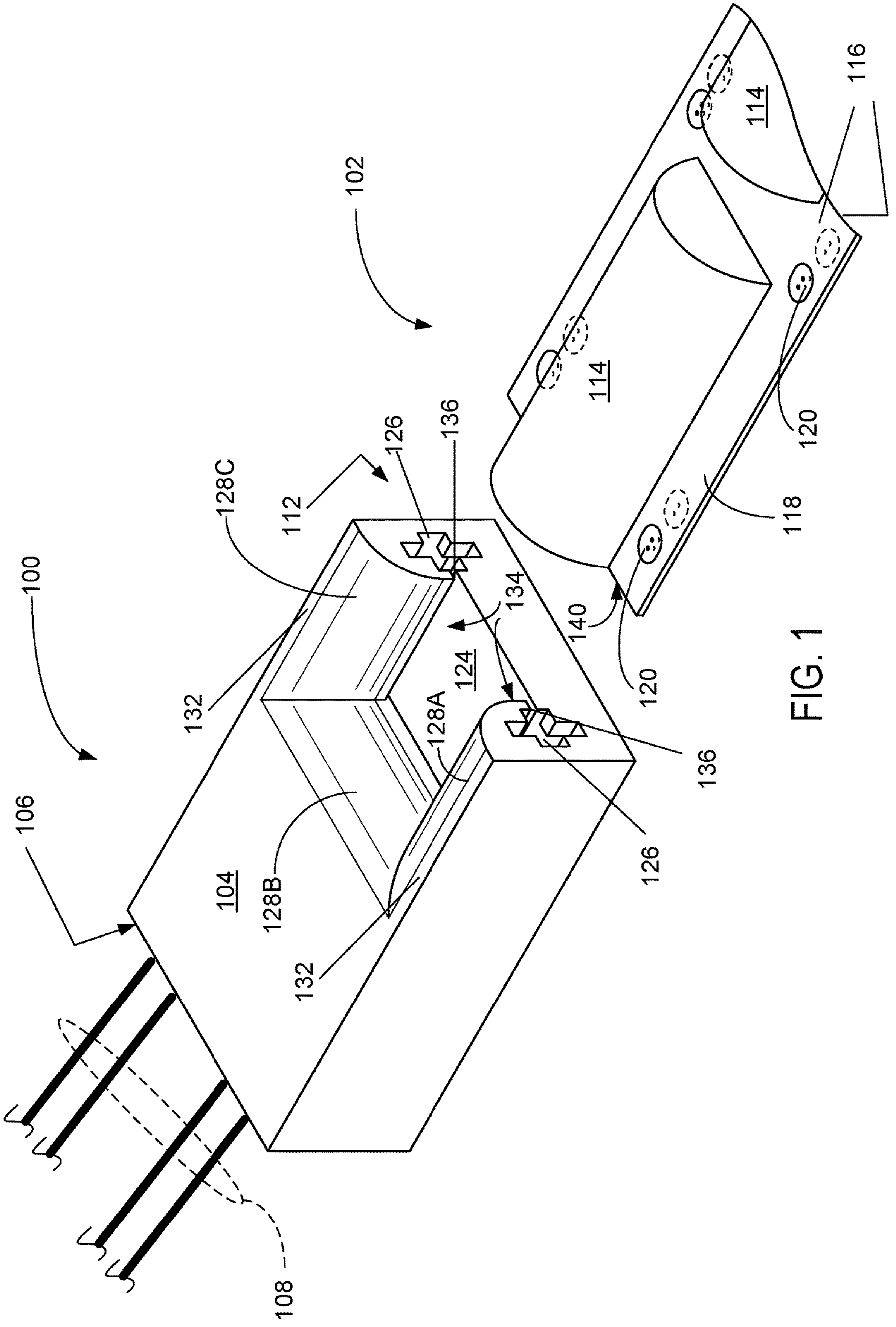
FIG. 1 is an example of a tape light termination system and an example of a light emitting diode (LED) tape light.

Referring to FIG. 1, a tape light termination system 100 and an example of a light emitting diode (LED) tape light are illustrated. The tape light termination system 100 includes a housing 104 having a first side 106 configured to receive conductors 108 and a second side 112 configured to receive the LED tape light 102. The first side 106 and the second side 112 may be located on opposite sides of the housing 104. The housing 104 may be formed of plastic or some other rigid material capable of being molded into predetermined dimensions and clearances. The conductors 108 may be wires or other conductive material surrounded by insulation capable of carrying control signals and/or power signals to control operation of the LED tape light 102.

The LED tape light 102 may include one or more LED diodes 114 mounted on a planar surface 116 of a flexible strip 118. The flexible strip 118 has a length greater than a width of the flexible strip 118, and a thickness of the flexible strip is less than the width. Portions of the planar surface 116 of the flexible strip 118 includes conductive pads 120. In some examples, the conductive pads 120 may be included on a top planar surface 116 alongside the LED diodes 114, or on a bottom planar surface 116 of the flexible strip 118 on a side of the flexible strip 118 that is opposite the planar surface 116 on which the LEDs 114 are positioned. In still other examples, the conductive pads 120 may be included on opposing planar surfaces 116, such as on the top planar surface 116 and the opposing bottom planar surface 116 of the flexible strip 118, either in a back-to-back configuration or a staggered configuration along the edges of the flexible strip 118. In other examples, the conductive pads 120 may be in different locations on the planar surfaces 116. In the illustrated example, two LED diodes 114 are illustrated as sequentially spaced apart on the planar surface 116 with conductive pads 120 along opposing edges of the flexible strip 118 positioned in the space adjacently between the two LED diodes 114. In other examples, other configurations/positions of LED diodes 114 and/or electrically conductive pads 120 on the planar surfaces 116 of the flexible strip 118 are possible.

The housing 104 may also include a landing shelf 124 formed in the housing to receive and align the LED tape light 102 with parallel slots 126. Each of the parallel slots 126 are shared slots formed in the housing 104 to receive a respective portion of the flexible strip 118 extending outwardly from the LED diode(s) 114, on opposite sides of the LED diode(s) 114. The landing shelf 124 may be a flat planar surface defined on three sides by first, second and third curved surfaces 128A, 128B and 128C. First and third curved surfaces 128A and 128C are on opposite sides of the landing shelf 124 and extend from an upper surface 132 of the housing 104 a predetermined length toward the landing shelf 124 so as to leave a gap 134 of, for example, in a range of between about 0.2 mm to 1.0 mm between a bottom edge 136 of the curved surfaces 128A and 128C and the landing shelf 124. (where about is +/−0.1 mm) The gaps 134 are entrances to the parallel slots 126, and are sized to receive and align a portion of the LED tape light 102 when the planar surface 116 of the LED tape light 102 on the side opposite the LED diodes 114 is received by and contiguously contacts the landing shelf 124.

The flat planar surface of the landing shelf 124 is aligned with the parallel slots 126 formed in the housing on either side of the landing shelf 124 such that a portion of the LED tape light 102 extends through the gap 134 into the parallel slots 126 when the lower planar surface 116 is contiguously aligned with the landing shelf 124. The landing shelf 124 positioned between the slots 126 may contiguously contact a planar surface 116 of the flexible strip 118 on the side opposite LED diodes 114 such that the landing shelf 124 cooperatively operates with the slots 126 to align an electrically conducting contact area of the terminal 202 to contiguously contact the electrically conductive pad 120 and enable the current flow path therebetween.

The second curved surface 128B extends from the upper surface 132 to form a wall abutting the landing shelf 124 and operable as a stop to preclude further progress of the LED tape light 102 into the housing 104 when the LED tape light 102 is inserted into the parallel slots 126 and is received by the landing shelf 124. An end or edge 140 of the flexible strip 118 may be positioned to abut the second curved surface 128B where the second curved surface 128B meets the landing shelf 124. Thus, the second curved surface 128B in cooperative operation with the parallel slots 126 provides three-dimensional alignment of the LED light strip 102.

Figure 2:
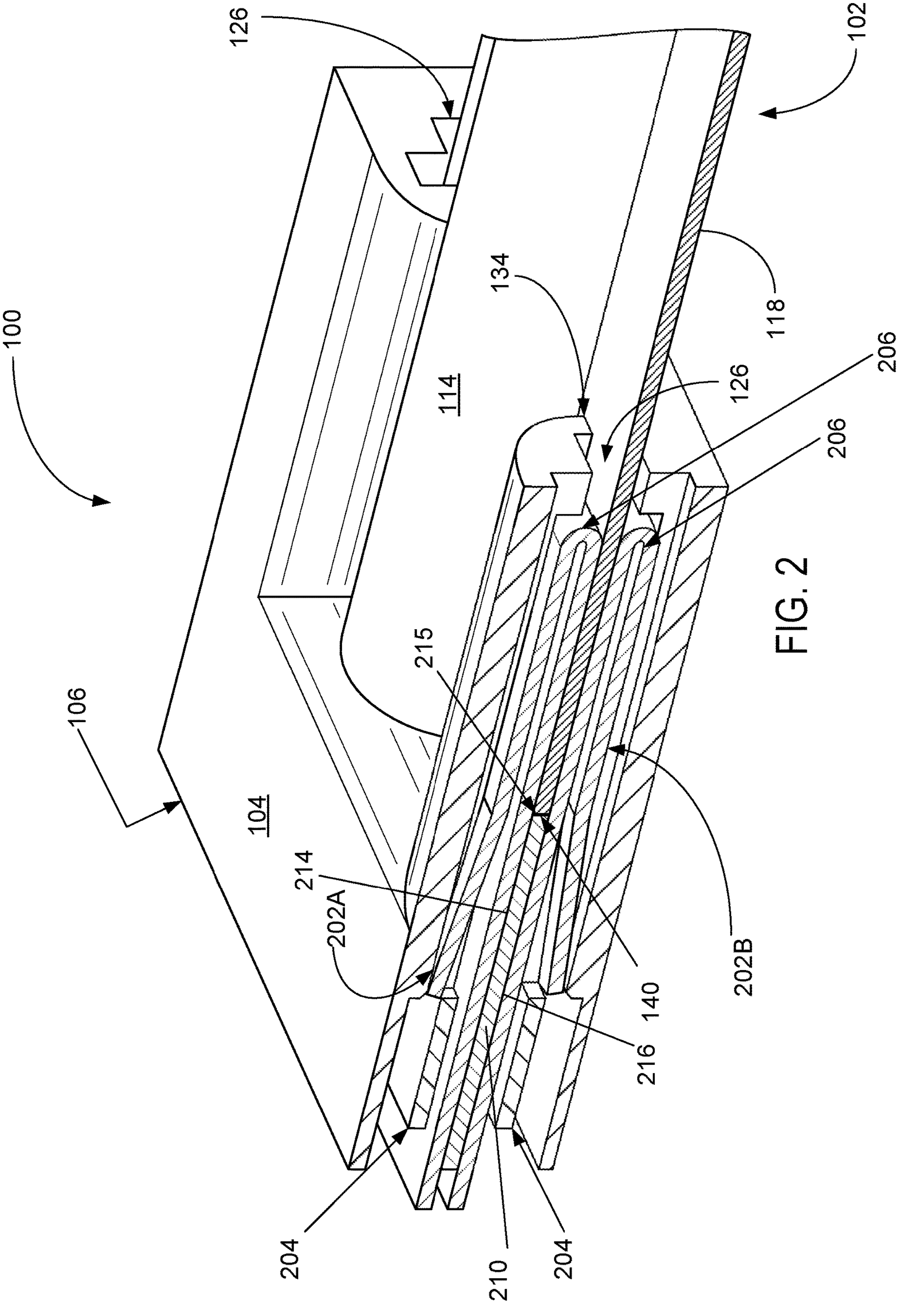
FIG. 2 is a cutaway perspective side view of the housing.

FIG. 2 is a cutaway perspective side view of an example housing 104. In the example of FIG. 2, with reference to FIG. 1, the LED tape light 102 is received by the landing shelf 124, and the peripheral edges of the LED tape light 102 are inserted through the gap 134 and into the respective parallel slots 126 to engage a terminal 202 mounted in the housing 104. In the illustrated example of FIG. 2, there is a top terminal 202A positioned in the housing 104 to lie above the LED tape light 102 and a bottom terminal 202B positioned in housing 104 below the LED tape light 102. Accordingly, a dual sided electrical connection with the LED tape light 102 is provided when the LED tape light 102 is inserted into the housing 104 through the shared slots 126.

The terminal 202 may be formed of metal or some other rigid but flexible electrically conductive material. The terminal 202 may be mounted in the housing 104 such that a conductor termination end 204 of the terminal 202 is aligned with the second side 106 of the housing 104. The conductor termination end 204 may be configured to electrically couple with one of the conductors 108, such as with a compression connection, lugs, solder, mechanical connection or any other fixed coupling providing an electrically conducting bond between the one of the conductors 108, and a respective terminal 202.

The terminal 202 may also include an LED tape light receptacle end 206 accessible from the first side 112 of the housing 104. The LED tape light receptacle end 206 of the terminal 202 is positioned in the housing 104 to electrically couple with the LED tape light 102, and more particularly, to the conductive pads 120 inserted into the parallel slots 126 through the gap 134.

In the cut-way view of FIG. 2, the terminals 202A and 202B are inserted into separate cavities in the connector assembly housing 104 positioned above and below the parallel slots 126. The terminals 202A and 202B in adjacent cavities are separated and electrically isolated from each other by an alignment wall 210 formed in the housing 104 at the conductor termination end 204. The alignment wall 210 may be a shared wall between cavities/compartments and extending only partially through the housing 104 to hold the terminals 202A and 202B in position in respective cavities/compartments. The terminal 202A in a respective first compartment may be in contiguous contact with a first side 214 of the alignment wall 210 and the terminal 202B in a respective second compartment is in contiguous contact with a second side 216 of the alignment wall 210. The first side 214 and the second side 216 may be opposite sides of the alignment wall 210.

At the LED tape light receptacle end 206, the terminals 202A and 202B are mounted to be separated apart when parallel slots 126 are empty, and when the portion of the flexible strip 118 is inserted into the parallel slots 126 the terminals 202A and 202B are separated and electrically isolated by the opposing planar surfaces 116 of the flexible strip 118. The end or edge 140 of the flexible strip 118 may be inserted into the housing 104 to abut an end 215 of the alignment wall 210. Thus, the end 140 of the LED tape light positioned on the landing shelf 124 is slidable into the housing 104 to butt up against the end 215 of the alignment wall 210 to align the LED tape light 102 in the housing 104 such that the terminals 202A and 202B are aligned with respective conductive pads 120 on the LED light tape 102.

The terminals 202A and 202B are independently connected to respective conductors 108 to provide different input signals/power to the conductive pads 120 on the opposing sides of the flexible substrate planar surface. In the illustrated example, there are two top terminals 202A mounted on opposite sides of the housing 104 and two bottom terminals 202B mounted on opposite sides of the housing 104, such that four independent and different power/control signals may be provided by the terminals 202A and 202B to drive the LED circuitry. Control may, for example, include sensing temperature sensing, power consumption, and the like, in order to control the operation of the LEDs, such as dimming and color. This allows the size of the conductive pads 120 on the opposing planar surfaces of the flexible substrate to be as wide as the flexible strip 118 allows while also providing four separate connections.

Figure 3A:
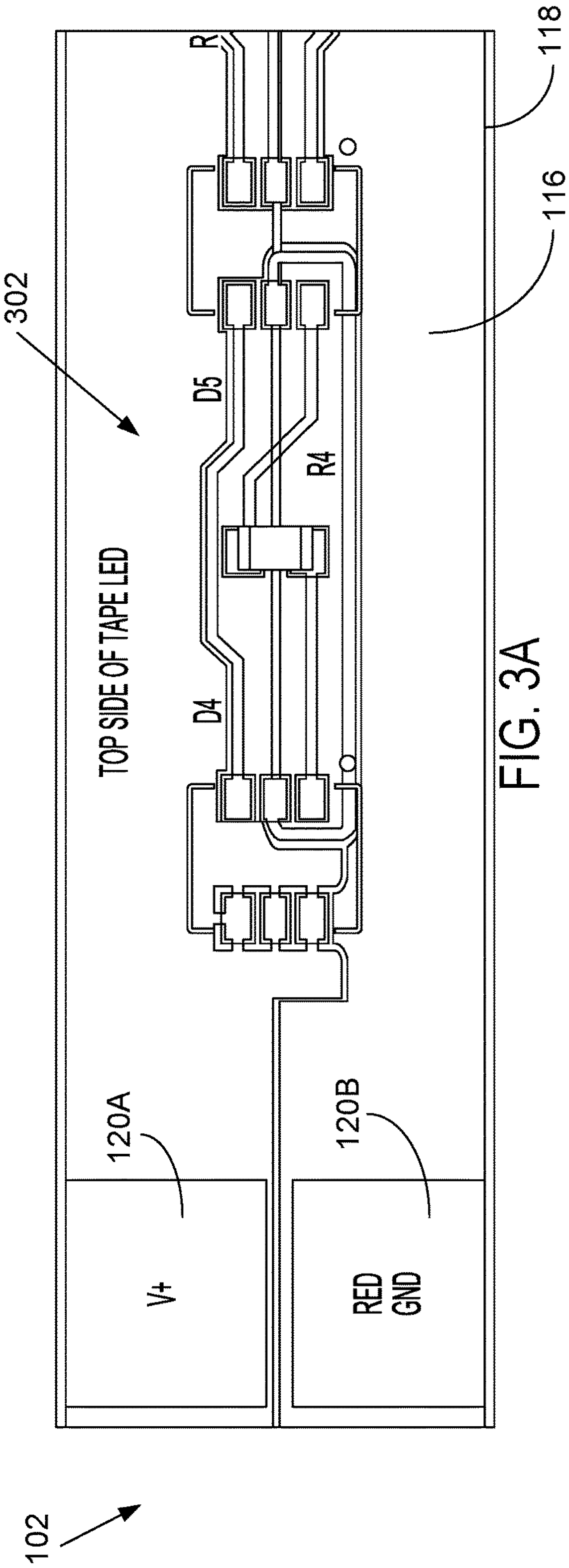
FIG. 3A is a schematic of an example of a top view of an LED tape light.
Figure 3B:
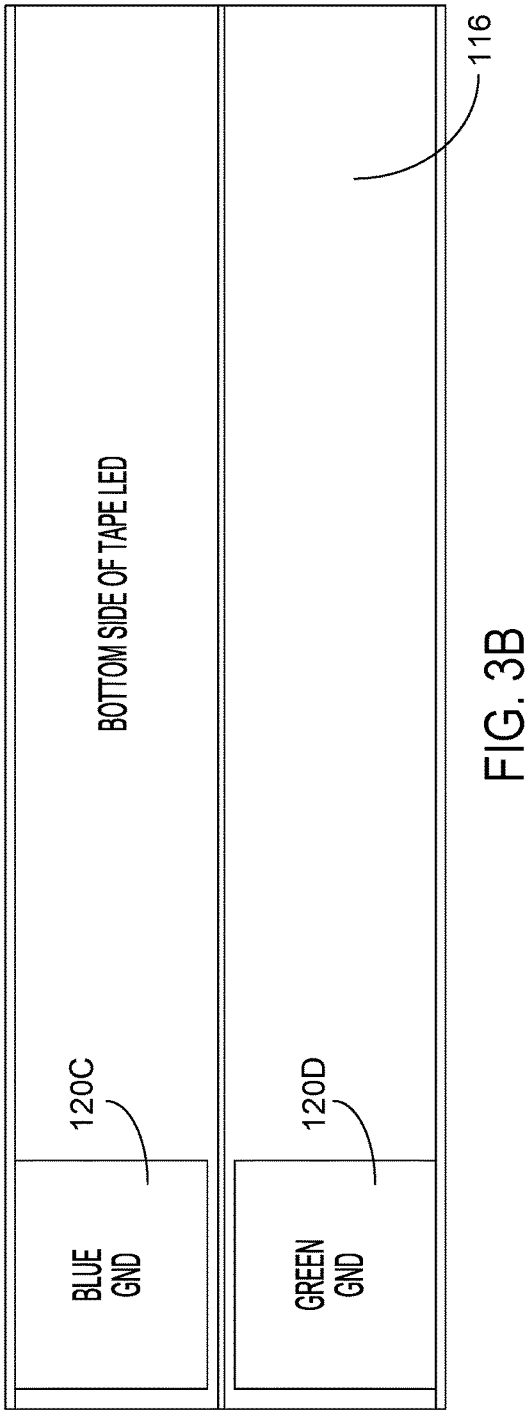
FIG. 3B is a schematic of an example of a bottom view of an LED tape light.

FIG. 3A is a schematic of an example of a top view of an LED tape light 102. FIG. 3B is a schematic of an example of a bottom view of an LED tape light 102. The LED tape light 102 may include a flexible substrate, such as a printed circuit board (PCB) having opposed planar surfaces 116 with a predetermined width between peripheral edges, such as 10 mm, and having a variable length. The LED tape light 102 may use surface mount technology to mount LED circuitry 302 to one of the planar surfaces to form a flexible continuous strip of light emitting diodes and include an adhesive, such as two-sided tape, on the opposite planar surface to provide an installation/mounting mechanism.

In the illustrated example, the LED tape light 102 is a RGB (red, green, blue) multicolor LED tape light. In other examples, the LED tape light 102 may be other types of LED tape lights, such as a white color tunable (CCT) LED tape light. In the example of FIG. 3A, the top schematic of the LED tape light 102 includes LED circuitry 302 having LED diodes D4 and D5 and a resistor R4 electrically coupled with a first top surface conductive pad supply power V+ 120 A.

The conductive pad supply power V+ 120 A may be electrically coupled with a conductor 108 used for providing a voltage and current supply to the LED tape light 102. A second top surface conductive pad RED GND 120B may provide a ground path to the LED circuitry 302. Accordingly, switching the ground path of a conductor 108 may energize and de-energize the tape LED 102 to provide red light using the current flow path through the conductive pad RED GND 120B.

In the example schematic of FIG. 3B, a conductive pad BLUE GND 120C and a conductive pad GREEN GND 120D may similarly energize the LED circuitry 302 to produce blue and green light respectively when switched to a ground connection. In the illustrated example, the conductive pads 120A-D are positioned at an end of the top and bottom planar surfaces 116 of the flexible strip 118.

In the example of FIGS. 3A and 3B, the LED tape light 102 is a red green blue (RGB) tape light and respective terminals 202 in respective compartments in the housing 104 have electrically conductive termination points aligned with opposing first and second planar surfaces 116 of the LED tape light 102 which correspond to red and blue electrically conductive pads on a first planar surface 116 of the LED tape light 102, and green and supply power electrically conductive pads on a second planar surface 116 of the LED tape light 102. The first and second planar surfaces 116 are on opposite sides of the flexible strip 118 of the LED tape light 102 as illustrated.

In other examples, other locations on the top and bottom planar surfaces 116 are possible for the conductive pads 120A-D. In addition, in other examples fewer conductive pads, such as a conductive pad supply power V+ and a conductive pad WHT GND, may be on the opposing planar surfaces 116. In still other examples, additional conductive pads may be included on the opposing planar surfaces 116 of the flexible strip 118 for example, conductive pad supply power V+, conductive pads 120A-D, and conductive pad WHT GND may be included in on opposing planar surfaces of the same LED tape light 102. This solution could be extended to additional top/bottom conductive pads may be accomplished by increasing the width of the flexible strip 118, or reducing the width of the conductive pads 120.

Since the tape LED 102 is closely aligned with the terminals 202 by the parallel slots 126, the area of each of the conductive pads 120 may be advantageously sized to optimize available real estate on the portion of the flexible strip 118 contained in the parallel slots 126. Even with relatively large conductive pads 120, the opposed surfaces provide twice the possible number of electrical connections when compared to a design having electrical connections with only one side of the strip 118. Thereby allowing for increased functionality in the same space. The tape light termination system therefore provides additional electrical connections to power and control the LED tape light 102 in a variety of application with more reliability and ease of use.

Figure 4:
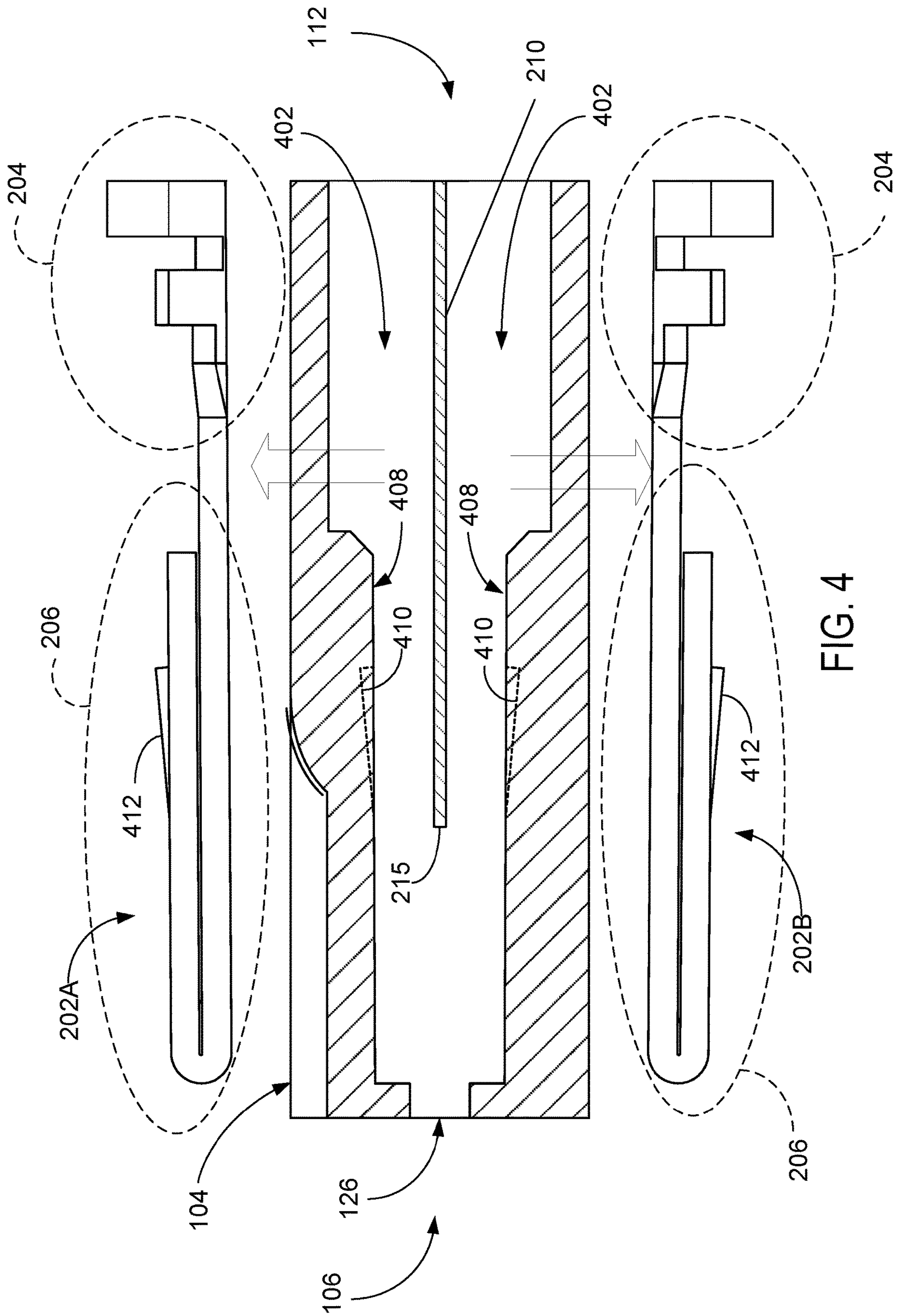
FIG. 4 is a cutaway side view of an example housing with the terminals removed to outside the housing.

FIG. 4 is a cutaway side view of an example housing 104 with the terminals 202 removed to outside the housing for clarity of explanation. As illustrated in FIG. 4, each of the terminals 202 are disposed in a separate compartment or cavity 402 in the housing such that a first terminal 202A is positioned above the parallel slots 126 for electrical coupling with a first side of the LED tape light 102 and a second terminal 202B is positioned below the parallel slots 126 for electrical coupling with a second side of the LED tape light 102, the first and second sides being the opposing planar surfaces 116 of the LED tape light 102. The conductor termination ends 204 of the first and second terminals 202A and 202B are separated by the alignment wall 210 extending partially through the housing 104, and the LED tape light receptacle end 206 of the first and second terminals 202A and 202B are spaced away a predetermined distance such that the portion of the LED tape light 102 received in the parallel slots 126 is compressively held between the first and second terminals 202A and 202B, as illustrated in FIG. 2.

The terminals 202A and 202B may be slidably installed in the respective cavities 402 by entry via the first side 112 of the housing 104. The installation may be performed by positioning the LED tape light receptacle end 206 in the housing 104 on the alignment wall 210. The cavity 402 in the housing 104 is sized to receive the terminal 202 between the centrally positioned alignment wall 210 and an outer interior wall 408 of the housing 104. The outer interior wall 408 forms part of the housing 104 and is formed to include a slot or channel 410 sized and shaped to receive a keeper tab 412 included on the terminal 202. The keeper tab 412 may be a piece of the terminal 202 that has been partially punched and bent away from the body. The keeper tab 412 may be release-able or have a non-release-able locking functionality for the system. In other examples, other forms of latches may be used in place of the keeper tab 402 and/or the channel 410, such as a clasp arrangement, friction fit, releasable socket, and the like.

In the example of FIG. 4, with reference also to FIG. 2, when the terminal 202 is inserted into the cavity 402 the keeper tab 412 may be compressed into the body of the terminal 202 by the terminal 202 being placed between the outer interior wall 408 and the alignment wall 210. When the releaseable keeper tab 412 aligns with the channel 410, the releaseable keeper tab 412 may move away from the body of the terminal 202 and into the channel 410 due to memory in the material forming the keeper tab 412. When the keeper tab 412 is extended into the channel 410, the position of the terminal 202 in the cavity 402 is fixedly maintained. Manual compression of the keeper tab 412 out of the channel 410 and toward the body of the terminal 202 may allow slideable removal of the terminal from the cavity 402.

With reference to FIGS. 1 and 4, when the LED tape light 102 is installed on the landing shelf 124 in the parallel slots 126, the portion of the LED light strip 102 in the parallel slots 126 is maintained electrically coupled with the respective terminals 202 on opposite sides of the landing shelf 124 by the terminal 202 being biased to fit within the passageway or cavity 402 in the housing 104 in which the terminal 202 resides. The conductive pads 120 on the top and bottom of the LED tape light 102 are aligned by these features of the housing 104 in the slots 126 to compresses the respective terminals 202 between the respective conductive pads 120 and the outer interior wall 408 of the housing 104 to securely create and maintain the electrical coupling.

Figure 5:
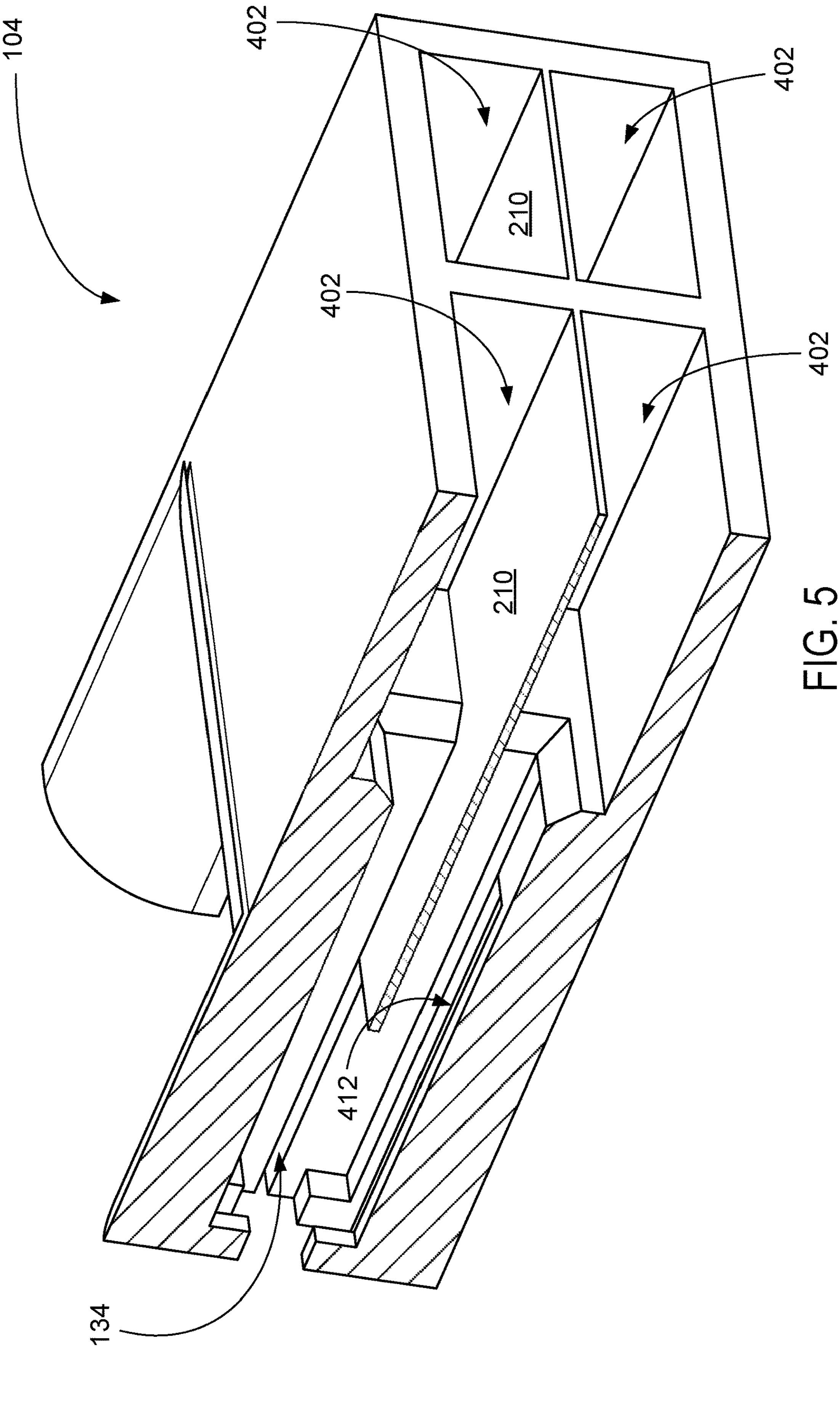
FIG. 5 is a perspective cutaway view of an example of the housing.

FIG. 5 is a perspective cutaway view of an example of the housing 104. In FIG. 5, four cavities 402 are illustrated. In other examples, additional or fewer cavities or compartments 402 may be formed in the housing 104 to position terminals 202 above and below alignment wall 210 to electrically couple with opposing planar surfaces of the LED tape light 102. The compartments 402 on a same side of the housing are formed to commonly align with a respective slot 126 such that one cavity 402 extends above the slot 126, and one cavity 402 extends below the slot 410.

Referring now to FIGS. 1-5, since cavities 402 are sized to receive and hold a respective terminal 402 electrically isolated from other terminals 202 positioned in other compartments 402, the terminals 402 are also aligned with the slots 134. The slots 134 are positioned and dimensioned to receive opposing edges of a light emitting diode (LED) tape light 102, which includes a flexible strip 118 having LED diode circuitry 302 mounted in a central area of a first planar surface 116 of the flexible strip 118. The flexible strip 118 may also include electrically conductive pads 120 on the first planar surface 116 and a second opposing planar surface 116 adjacent at least one edge of the opposing edges of the LED tape light. Thus, each of the slots 126 provide access in the housing 104 to the electrically conductive contact point of respective terminals 202 in the compartments 402, and alignment of the electrically conducting contact point of the respective terminal 202 to contiguously contact the electrically conductive pad and enable a current flow path between the terminal 202 and the LED diode circuitry 302. As also discussed with reference to at least FIG. 2, the end or edge 140 of the LED tape light 102 that is positioned on the landing shelf 124 is slidable into the housing 104 to butt up against an end 215 of the alignment wall 210 to align the LED tape light 102 in the housing 104.

Figure 6:
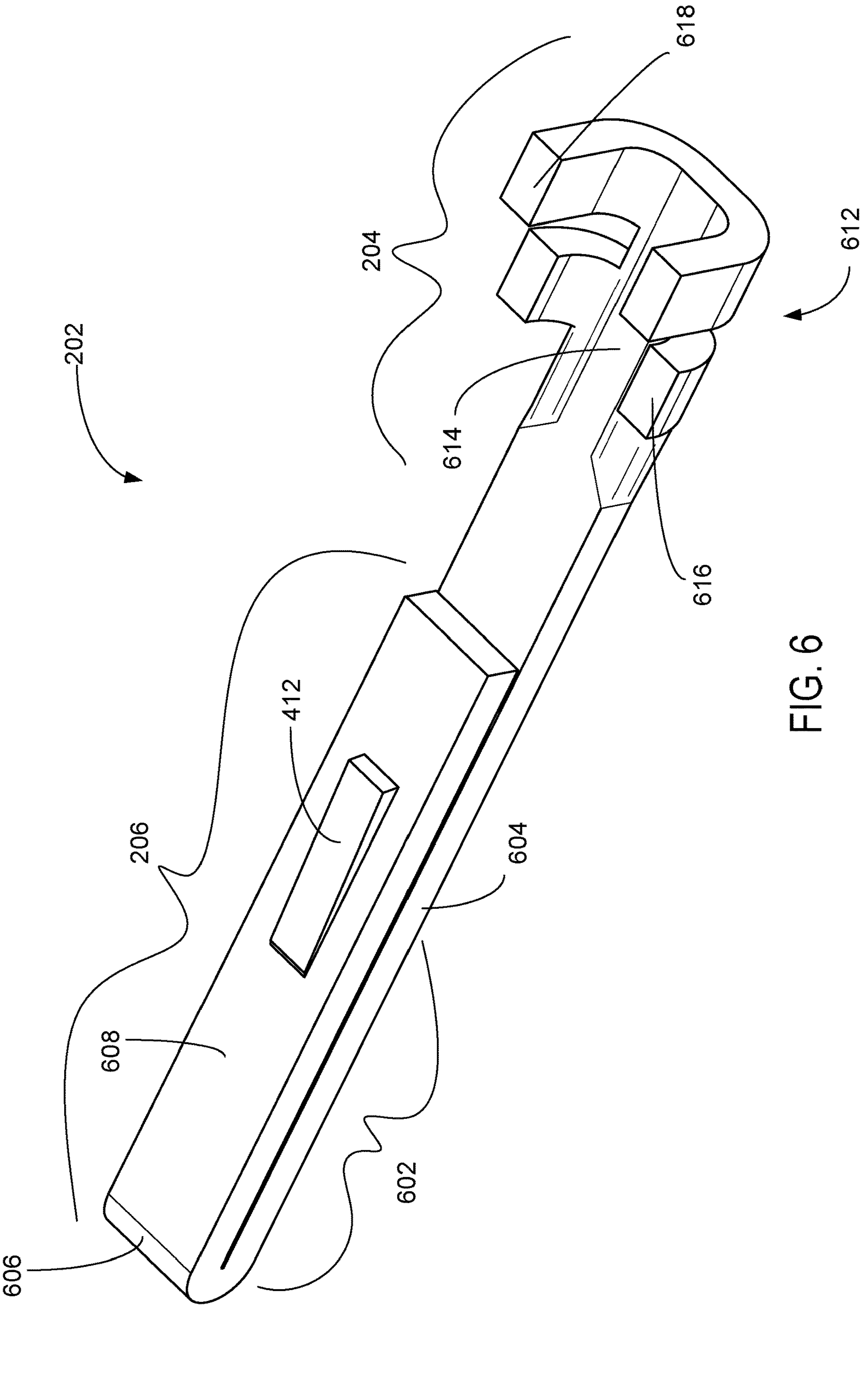
FIG. 6 is a perspective view of an example terminal 202.

FIG. 6 is a perspective view of an example terminal 202. The terminal 202 includes an electrically conducting contact area 602 within the LED tape light receptacle end 206. In the illustrated example, the LED tape receptacle area 206 is formed by a flexible material that is bent into an overlapped condition having a first straight member section 604, a curved member section 606, and a second straight member section 608 rigidly aligned in parallel with the first straight member section 604 by the curved member section 606. The electrically conducting contact area 602 may include the entirety of the first straight member section 604, or may be a smaller area less than the entirety of the first straight member section 604.

The second member section 606 may include the releaseable keeper tab 412. In some examples, the releaseable keeper tab 412 may include memory to snap into the slot or channel 410 as described elsewhere. In other examples, the memory may be provided by the curved member section 606 to compressibly maintain the terminal 202 in the compartment 402. In addition, the releaseable keeper tab 412 may provide memory bias to urge the electrically conducting contact area 602 into contiguous contact with the conducting pads on the LED tape light 102. In addition, or alternatively, curved member section 606 may include memory bias to urge the electrically conducting contact area 602 into contiguous contact with the conducting pads on the LED tape light 102. As also described elsewhere, respective terminals 202 are disposed in the respective compartments 402 in the housing 104 to align with opposing planar surfaces 116 of the LED tape light 102. Each of the opposing planar surfaces 116 may have at least one electrically conductive pad 102 adjacent at least one edge of the opposing edges of the LED tape light 102 to create the current flow path for each respective terminal 202 to the LED diode circuitry 302.

Within the conductor termination end 204 of the terminal 202, is a conductor termination point 612. The conductor termination point 612 may be a mechanical termination point having a conductive area 614 that is in electrical communication with the electrically conducing contact area 602. In the illustrated example, the conductor termination point includes wire crimp arms 616 to mechanically press a conductive part of a conductor 108 into contiguous electrical contact with the conductive area 614, and insulation crimp arms 618 to mechanically grip an insulation sheath on the conductor 108.

Referring to FIGS. 2, 4 and 5, when the LED tape light 102 is absent from the housing 104, the electrically conductive contact area 602 of the terminal 202 in a respective first compartment 402 and the electrically conductive contact area 602 of the terminal 202 in a respective second compartment 402 are spaced away from each other a predetermined distance with an airspace therebetween. The airspace is sized to receive a portion of the flexible strip of the LED tape light in the airspace when the LED tape light is inserted into the slots 126 via the gaps 134. The airspace is maintained when the LED tape light 102 is not positioned between the terminals due to the conductor termination end 204 of each of the terminals 202 being contiguously aligned with the alignment wall 210. Thus, it is the thickness of the alignment wall 210 that may establish and maintain the air space between the respective electrically conducting contact areas 602 when the LED light tape 102 is absent from the slots 126.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

We claim:

1. A tape light termination system comprising:

a housing having a first side configured to receive conductors and a second side configured to receive a light emitting diode (LED) tape light comprising LED diodes mounted on a planar surface of a printed circuit board strip; and a plurality of terminals mounted in the housing such that a conductor termination end of the terminals is aligned with the second side of the housing and configured to electrically couple with the conductors, and an LED tape light receptacle end of the terminals is accessible from the first side of the housing;

the housing comprising a landing shelf formed in the housing and sized to receive the LED tape light, the landing shelf aligned with parallel slots formed in the housing on either side of the landing shelf to receive a portion of the LED tape light, the LED tape light receptacle end positioned in the housing to electrically couple with the LED tape light and each of the terminals disposed in a compartment in the housing such that a first terminal is positioned above the parallel slots for electrical coupling with a first side of the LED tape light and a second terminal is positioned below the parallel slots for electrical coupling with a second side of the LED tape light, the first and second sides being on opposing planar surfaces of the LED tape light.

2. The tape light termination system of claim 1, wherein the conductor termination end of the first and second terminals are separated by an alignment wall extending partially through the housing, and the LED tape light receptacle end of the first and second terminals are spaced away a predetermined distance such that the portion of the LED tape light received in the parallel slots is compressively held between the first and second terminals.

3. The tape light termination system of claim 2, wherein an end of the LED tape light positioned on the landing shelf is slidable into the housing to butt up against an end of the alignment wall to align the LED tape light in the housing.

4. A tape light termination system comprising:

a housing having a first side configured to receive conductors and a second side configured to receive a light emitting diode (LED) tape light comprising LED diodes mounted on a planar surface of a printed circuit board strip; and a terminal mounted in the housing such that a conductor termination end of the terminal is aligned with the second side of the housing and configured to electrically couple with the conductors, and an LED tape light receptacle end of the terminal is accessible from the first side of the housing;

the housing comprising a landing shelf formed in the housing and sized to receive the LED tape light, the landing shelf aligned with parallel slots formed in the housing on either side of the landing shelf to receive a portion of the LED tape light, the LED tape light receptacle end positioned in the housing to electrically couple with the LED tape light, wherein the housing includes a cavity sized to receive the terminal between a centrally positioned alignment wall and an outer wall, the outer wall having a channel to receive a releasable keeper tab included on the terminal to maintain the position of the terminal in the cavity.

5. The tape light termination system of claim 1, wherein the portion of the LED tape light is maintained electrically coupled with the terminal by the terminal being biased to fit within a cavity in the housing in which the terminal resides.

6. The tape light termination system of claim 1, wherein the first side is located at an opposite side of the housing from the second side.

7. The tape light termination system of claim 1, wherein the portion of the LED tape light comprises conductive pads, and the LED tape light is aligned by the housing in the slot to compress the terminal between the conductive pads and the housing to create the electrical coupling.

8. The tape light termination system of claim 1, wherein the printed circuit board strip is a flexible strip having a length greater than a width, and a thickness less than the width.

9. A tape light termination system comprising:

a terminal comprising an electrically conducting contact area and a termination lug to fixedly connect an electric conductor with the terminal and provide an electrically conducting path between the termination lug and the contact area; and a housing having a plurality of compartments and a plurality of slots, each of the compartments sized to receive and hold the terminal, and the slots positioned and dimensioned to receive opposing edges of a light emitting diode (LED) tape light comprising a flexible strip having LED diode circuitry mounted in a central area of a planar surface of the flexible strip, the flexible strip also including an electrically conductive pad on the planar surface adjacent at least one edge of the opposing edges of the LED tape light, wherein each of the slots provide access in the housing to the electrically conductive contact area and alignment of the electrically conducting contact area of the terminal to contiguously contact the electrically conductive pad and enable a current flow path therebetween, wherein a respective terminal is disposed in respective compartments in the housing to align with opposing planar surfaces of the LED tape light, each of the opposing planar surfaces having the electrically conductive pad adjacent the at least one edge of the opposing edges of the LED tape light to create the current flow path for each respective terminal.

10. The tape light termination system of claim 9, wherein the LED tape light is a red green blue (RGB) tape light and respective terminals in respective compartments in the housing have electrically conductive termination points aligned with opposing first and second planar surfaces of the LED tape light, the electrically conductive termination points of the respective terminals corresponding to red and blue electrically conductive pads on a first planar surface of the LED tape light, and green and supply power electrically conductive pads on a second planar surface of the LED tape light, wherein the first and second planar surfaces are on opposite sides of the flexible strip included in the LED tape light.

11. A tape light termination system comprising:

a terminal comprising an electrically conducting contact area and a termination lug to fixedly connect an electric conductor with the terminal and provide an electrically conducting path between the termination lug and the contact area, and a housing having a plurality of compartments and a plurality of slots, each of the compartments sized to receive and hold the terminal, and the slots positioned and dimensioned to receive opposing edges of a light emitting diode (LED) tape light comprising a flexible strip having LED diode circuitry mounted in a central area of a planar surface of the flexible strip, the flexible strip also including an electrically conductive pad on the planar surface adjacent at least one edge of the opposing edges of the LED tape light, wherein each of the slots provide access in the housing to the electrically conductive contact area and alignment of the electrically conducting contact area of the terminal to contiguously contact the electrically conductive pad and enable a current flow path therebetween, and wherein the terminal in a respective first compartment is in contiguous contact with a first side of an alignment wall included in the housing, and the terminal in a respective second compartment is in contiguous contact with a second side of the alignment wall, wherein the alignment wall is a shared wall between compartments and extends only partially through the housing, and the first side and the second side are opposite sides of the alignment wall.

12. The tape light termination system of claim 11, wherein the electrically conductive contact area of the terminal in the respective first compartment and the electrically conductive contact area of the terminal in the respective second compartment are spaced away from each other a predetermined distance with an airspace therebetween to receive a portion of the flexible strip in the airspace.

13. The tape light termination system of claim 11, wherein an edge of the flexible strip of the LED tape light abuts an end of the alignment wall, the end of the alignment wall within the housing.

14. The tape light termination system of claim 9, wherein the housing further comprises a landing shelf positioned between the slots, wherein the landing shelf comprises a flat planar surface that contiguously contacts a planar surface of the flexible strip such that the landing shelf cooperatively operates with the slots to align the electrically conducting contact area of the terminal to contiguously contact the electrically conductive pad and enable the current flow path therebetween.

15. The tape light termination system of claim 14, wherein the flat planar surface of the landing shelf abuts a wall extending between the slots, the wall operable as a stop to preclude further entry into the housing of the opposing edges of the LED tape light and the flexible strip.

16. A tape light termination system comprising:

a housing having a plurality of compartments that are aligned in the housing to have a common wall therebetween;

a plurality of terminals, each of the terminals positioned in a respective one of the compartments; and at least two of the compartments having a shared slot providing egress to the at least two compartments by a light emitting diode (LED) tape light comprising a flexible strip, wherein the flexible strip is receivable in the shared slot to extend between and separate the at least two compartments from each other, and the flexible strip is electrically coupled with the terminals on opposite sides of the flexible strip, wherein the shared slot is formed in the housing and dimensioned to receive an edge of the light emitting diode (LED) tape light, the light emitting diode (LED) tape light comprising LED diode circuitry mounted in a central area of a planar surface of the flexible strip and electrically conductive pads on opposing planar surfaces of the flexible strip adjacent the edge of the LED tape light, wherein the shared slot causes alignment of an electrically conducting contact area of the terminals to contiguously contact the electrically conductive pads on the opposing planar surfaces of the flexible strip.

* * * * *